Oct. 26, 1948.  J. L. PETTUS  2,452,322
LIGHT MODULATOR MOUNT
Filed April 4, 1947  2 Sheets-Sheet 1
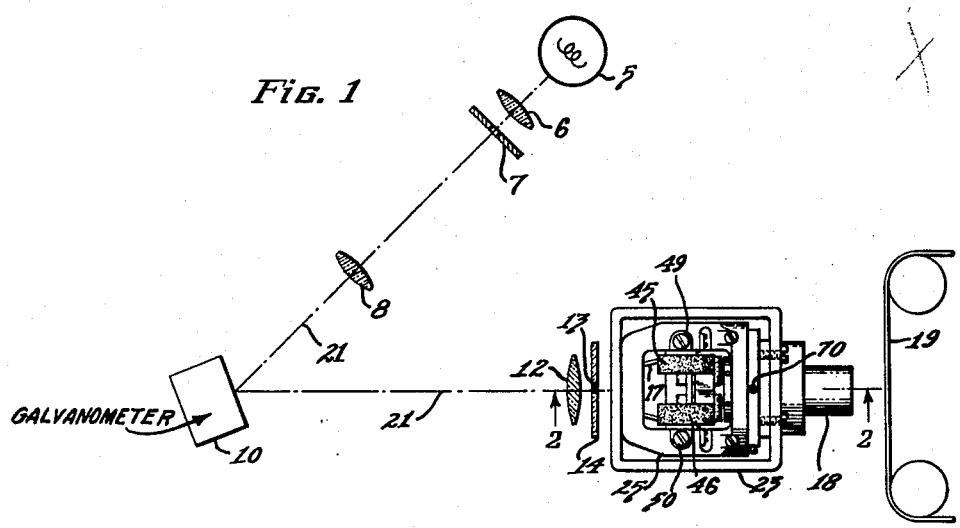
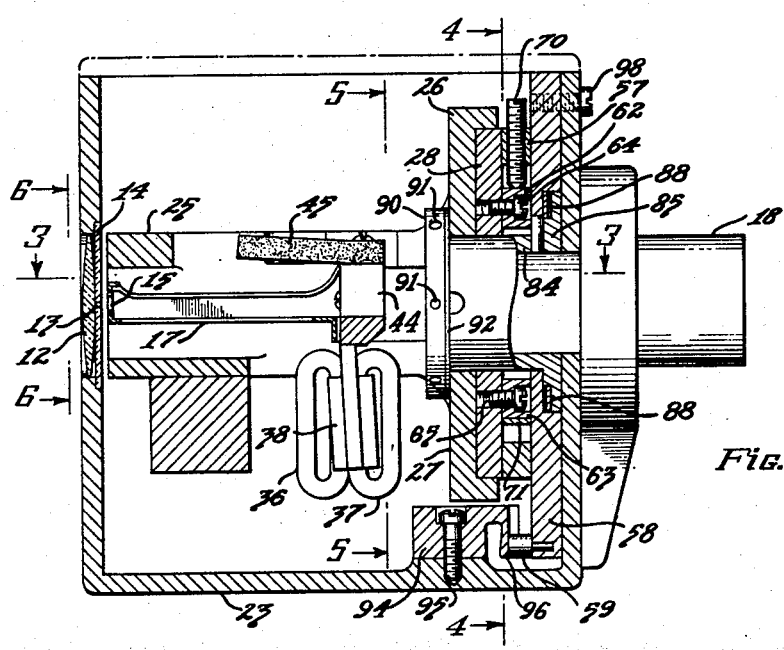
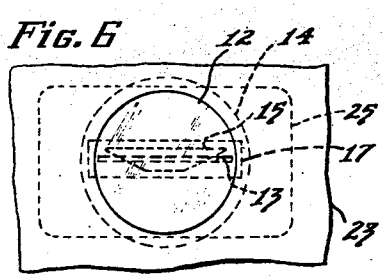
JAMES L. PETTUS,
Inventor
By *Orl R. Gorham*
Attorney Oct. 26, 1948.  J. L. PETTUS  2,452,322
LIGHT MODULATOR MOUNT Filed April 4, 1947  2 Sheets-Sheet 2

JAMES L. PETTUS
Inventor

By Carl R. Goshaw
Attorney

Patented Oct. 26, 1948

2,452,322

UNITED STATES PATENT OFFICE 2,452,322

LIGHT MODULATOR MOUNT

James Lawrence Pettus, Sherman Oaks, Calif., assignor to Radio Corporation of America, a corporation of Delaware Application April 4, 1947, Serial No. 739,484

7 Claims. (Cl. 88—61)

This invention relates to a light modulator and particularly to an adjustable mount for a ground noise reduction shutter used in sound film recording systems.

In the recording of sound film two principal types of systems are used, such as the variable area system wherein the length of a line of light is lengthened and shortened according to the amplitude of the signal frequencies, and the variable density system wherein a constant length line of light is varied in intensity or in time of impression on the film. Both of these principal recording methods employ noise reduction in various forms, such as a biased galvanometer or light valve or a shutter. The present invention is directed to the shutter type of noise reduction system wherein the line of light impressed on the film is lengthened to the extent required by the instantaneous amplitudes of the signal. Thus, at times of no signal a very narrow line of light reaches the film, the average length of the line increasing as the amplitude of the signal increases.

The shutter of the present invention is of the single vane type wherein an opening in the end of a shutter defines the amount of light passing to the film. Since the shutter functions in cooperation with a light slit it is realized that very accurate positioning of the light interception edges of the shutter is required, which necessitates a mounting which provides adjustability of the shutter aperture in a plurality of directions, such as those at right angles to one another and perpendicular to the optical axis. These adjustments may be made with the present type of noise reduction shutter mount simply and accurately when the shutter is placed and mounted in the optical system.

The principal object of the invention, therefore, is to facilitate the mounting and adjustment of a light modulating element.

Another object of the invention is to provide an improved ground noise reduction shutter mounting and adjustments therefor.

A further object of the invention is to provide a light beam modulating element structure which is readily mountable in a sound recording system and which may be easily adjusted in a plurality of directions.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a diagrammatic view of a sound recording system showing the essential elements thereof and a plan view of the shutter mount embodying the invention;

Fig. 2 is a cross sectional view of the shutter mechanism and mount therefor taken along the line 2—2 of Fig. 1;

Fig. 6 is a detailed view of the invention showing the relationship between the aperture in the noise reduction shutter and the light passing slit of the optical system.

Figure 3:
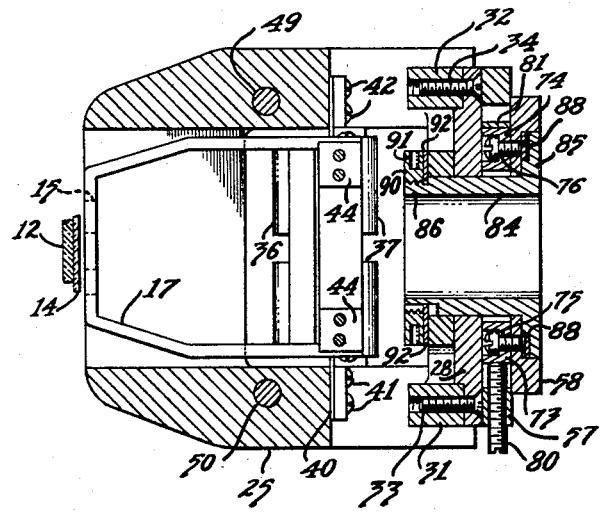
Fig. 3 is a cross sectional view of the invention taken along the line 3—3 of Fig. 2.

Referring now to the drawings in which the same numerals identify like elements and particularly to Fig. 1, light from a source 5 is gathered by a lens 6 and projected through an aperture in a plate 7 and through a lens 8 to the mirror of a galvanometer 10. From the galvanometer 10 the light is reflected to a lens 12, then through slit 13 in a slit plate 14 (see Fig. 6), then through an opening 15 in the end of a shutter 17, and then through an objective lens 18 to a film 19. This is a general form of optional system employed for recording variable area sound tracks. The light beam, having an optical axis shown by broken line 21, is vibrated by the galvanometer mirror in accordance with the instantaneous values of amplitude and frequency of the signal currents while the length of the beam is varied by shutter 17 in accordance with the average, or rectified value of the signal currents. Thus, as the light beam is vibrated normally to the slit 13, the trapezoidal opening 15 is also vibrated, the sloping or beveled light cutting edges of the opening varying the average amount of light passing through the slit 13.

In view of the above described function of the shutter, the opening 15 must be very accurately aligned with the longitudinal axis of the slit, not only rotationally but at right angles to the optical axis. These adjustments have been provided for in the mounting of the shutter and its magnetic motor as well as providing a simple and accurate means of mounting the entire unit into the optical system.

The unit is housed within a casing 23 which is rectangular in shape and has a removable cover (not shown). The unit is constructed on a substantially rectangular frame 25 which is tapered at one end and circular at the other end forming an integral ring with two outer sections 26 and 27. The sides of the frame adjacent the sections 26 and 27 are apertured or slotted. Within an annular groove in the sections 26 and 27 is a rotatable ring 28 which has two blocks 31 and 32, attached thereto by screws 33 and 34, respectively, diametrically opposite one another and located in the apertures in the sides of the frame 25 when the unit is assembled.

Referring now to the motor mechanism, four coils, two of which are shown at 36 and 37 in Fig. 2, have an armature 38, positioned between their pole pieces, which is connected to a rotational spring mount 40, attached to the frame 25 by screws 41 and 42. At right angles to the armature and connected thereto, is a thin trapezoidal shaped shutter frame 17 having the trapezoidal shaped aperture 15 in the end thereof. Two blocks 44 are provided perpendicular to the plane of the shutter and on the ends of which are mounted two resilient line dampers 45 and 46 in a plane parallel to the plane of the shutter. The magnet and its circuit are held to the frame 25 by a pair of screws 49 and 50 which pass through the frame 25.

Now, as the rectified signal current is impressed on the coils, the armature 38 vibrates from right to left, as shown in Fig. 2, and the end of the shutter 17 will vibrate vertically in a corresponding manner, the sloping edges of the aperture 15 thereby controlling the length of the light beam passing the slit 13. Thus, the aperture 15 must be adjustable so as to bear the proper relationship to the position of the light beam as it emerges from the slit 13. As described above, the ring 28 is rotatable within the frame ring sections 26 and 27 and these units are finely adjustable with respect to one another by the provision of a screw 52 threaded into one of the walls or legs of the apertured frame 25 and bearing against the block 31 attached to the ring 28. Between the block 32 and the wall or leg of the other aperture of the frame is a compression spring 53 which maintains the block 31 tightly against the end of screw 52.

Now, assuming the ring 28 is held stationary, advancement of the screw 52 will rotate the frame 25 in one direction against the tension of spring 53 and, consequently, the opening 15 in the end of the shutter 17 will be rotated. If the screw 52 is backed off, the spring 53 will rotate the frame in the opposite direction. After the proper rotational position has once been established for the aperture 15 it is only necessary to tighten a screw 55 which will pass through the spring 53 and abut the block 32 to firmly lock the frame in position with respect to the ring 28.

Figure 4:
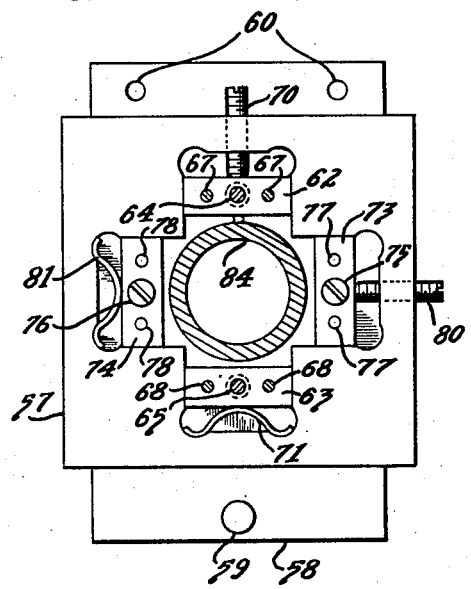
Fig. 4 is a plan view of the right angle adjusting structure taken along the line 4—4 of Fig. 2.
Figure 5:
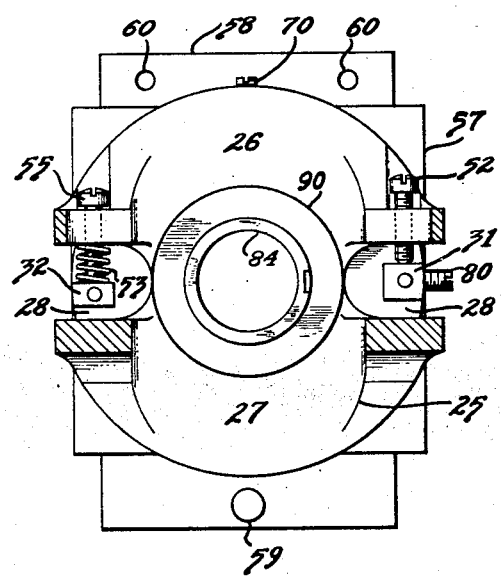
Fig. 5 is an end view of the rotational adjustment mechanism of the invention taken along the line 5—5 of Fig. 2.

To adjust the aperture 15 in two directions at right angles to one another and perpendicular to the optical axis 21, a two section Maltese cross type of mount has been provided. This mount has a substantially square plate 57 with a cross aperture therein and a solid rectangular plate 58 having an extending pin 59 and a pair of screw holes 60. To the opposite surface of the ring 28 from which blocks 31 and 32 are attached, two blocks 62 and 63 are positioned by screws 64 and 65, respectively. (See Fig. 2.) Blocks 62 and 63 are of a length and thickness to accurately fit in the upper and lower ends of the cross (see Fig. 4) and may be fixedly held in position by dowels, such as shown at 67 and 68. Passing through the upper and narrow portion of the edge of the plate 57 is a screw 70, the end of which bears against the edge of block 62, while bearing against the far edge of block 63 is a marcel spring 71. Thus, if the plate 57 is held stationary, advancement of the screw 70 will lower the frame 25 against the tension of spring 71, while if the screw 70 is backed off, the spring 71 will raise the frame 25. Thus, the end of the shutter 17 may be vertically adjusted at right angles to the optical axis 21.

To the rectangular plate 58, there are attached two blocks 73 and 74 by respective screws 75 and 76 and respective dowels 77 and 78 similar to blocks 62 and 63 attached to ring 28. The blocks 73 and 74 are also of a length and thickness to be accommodated in the horizontal ends of the cross aperture in the plate 57. Bearing against the outer edge of the block 73 is the end of a screw 80 in the side of plate 57 similar to the screw 70 in the upper block 62, while a marcel spring 81 bears against the far edge of block 74 in the same manner as the spring 71 bears against the edge of block 63. Now, if the rectangular plate 58 is held stationary, the square plate 57 may be moved back and forth horizontally by advancing and backing off the screw 80 which will, consequently, move the end of shutter 17 at right angles to the optical axis 21 and parallel to the longitudinal axis of slit 13. Thus, a third adjustment of the light controlling aperture 13 is provided.

The plates 57 and 58 are held in operative relationship with respect to the frame 25 by a cylindrical hollow bolt 84 having a head flange 85 and a threaded end section 86. The hollow bolt 84 is passed through the openings in the plates 57 and 58, the head flange 85 fitting into a recess in the plate 58 and spaced therefrom by a spring washer 88. Thus, the surface of the head 85 and the surface of the plate 58 are flush with one another. To lock the bolt 84 in position a collar nut 90 is provided which is threaded on the end 86 by the use of a pin wrench in a series of radial holes 91. A spring washer 92 is used between the nut 90 and the ring of the frame 25. To make the various adjustments the nut 90 is slightly loosened and after they have been made, tightening of the nut 90 locks them all in fixed position.

To fasten the unit just described in proper position in the casing 23, there is provided at the bottom of the casing a block 94 attached to the casing by a screw 95, the block having an overhanging grooved portion 96. The rectangular plate 58 of the unit is placed in the casing 23 so that the pin 59 slides into the groove of the block 96 and downwardly to the lower end of the overhang 96. This tightly wedges the lower edge of the plate 58 against the lower portion of the side of the casing 23. Screws, such as shown at 98, are now threaded into holes 60 in the casing 23 and the tightening thereof draws the upper end of the plate back against the wall of the casing 23. This provides an attachment which can be rapidly made, but when made is firm and accurate. Access to the vertical adjustment screw 70 is from the top and access to the horizontal adjustment screw 80 is through an opening in the side of the casing 23. The rotational adjustment screws 52 and 55 are also accessible from the top as well as the wrench holes 91 of the nut 90 when the cover is removed from the casing 23.

The above described shutter construction and mounting, therefore, provides a simple means of attaching the noise reduction shutter and motor therefor into the optical system and simple and accurate vernier controls for adjusting the aperture in the shutter in three directions, two at right angles to one another and to the optical axis, and a third rotationally about the optical axis. With this type of mount the working opening in the shutter can be quickly and accurately aligned or positioned to intersect the light beam at the proper point or points.

I claim:

1. A light modulator and mount therefor comprising a motor element, a light modulating element vibratable by said motor element, a frame for supporting said elements in an optical system, and a mounting means for said frame, said means including transversely adjustable plates and a rotatable ring for adjusting said light modulating element in transverse directions at right angles to one another and rotationally.

2. A light modulator and mount therefor in accordance with claim 1 in which one of said plates has a pair of crossed slots therein, said ring having blocks slideable in one of said slots and said other plate having blocks slideable in the other of said slots.

3. A light modulator and mount therefor in accordance with claim 2 in which means are provided to pass through aligned openings in said plates, said ring and said frame for maintaining said elements in any adjusted position relative to one another.

4. A light modulator and mount therefor comprising a rectangular frame having a slot at one end and a ring at the other end, a light modulating shutter vibratable in said slot, motor means attached to said frame for vibrating said shutter with respect to a light beam through said slot, means on which said frame is adjustable rotatably, and means on which said frame is adjustable in two directions at right angles to one another in a plane perpendicular to the axis of said light beam modulated by said shutter.

5. A light modulator and mount therefor in accordance with claim 4 in which said last mentioned means comprises a pair of plates, one of said plates having two slots therein positioned at right angles to one another, means attached to said second plate and slideable in one of said slots, and means attached to said first mentioned means and slideable in the other of said slots.

6. A light modulator and mount therefor comprising a frame having a substantially rectangular opening at one end and a substantially circular opening at the other end, means mounted within said frame for modulating a light beam passing through said openings, modulator means attached to one side of said frame for actuating said light modulating means, means attached to the end of said frame having the circular opening therein on which said frame is rotatable, and a pair of plates attached to said last mentioned means on which said frame is movable in two directions at right angles to one another, one of said plates having means thereon for mounting said light modulator and mount in an optical system.

7. A light modulator and mount therefor in accordance with claim 6 in which said one of said plates intermediate the other of said plates and said first mentioned means is slotted with two slots at right angles to one another, projections being provided on said other plate for movement within one of said slots and projections being provided on said first mentioned means for movement in the other of said slots.

JAMES LAWRENCE PETTUS.

REFERENCES CITED

The following references are of record in the file of this patent:

UNITED STATES PATENTS

| Number | Name | Date |
| --- | --- | --- |
| 2,055,654 | Chambers | Sept. 29, 1936 |